(12) United States Patent
Nishikawa et al.

(10) Patent No.: US 11,370,560 B2
(45) Date of Patent: Jun. 28, 2022

(54) STORAGE SYSTEM FOR FLYING OBJECT

(71) Applicant: HONDA MOTOR CO., LTD., Tokyo (JP)

(72) Inventors: Shosei Nishikawa, Wako (JP); Yuji Ishitsuka, Wako (JP); Akinori Kita, Wako (JP); Yuya Ishihara, Wako (JP); Koji Muraoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 761 days.

(21) Appl. No.: 16/140,619

(22) Filed: Sep. 25, 2018

(65) Prior Publication Data

US 2019/0106224 A1 Apr. 11, 2019

(30) Foreign Application Priority Data

Oct. 5, 2017 (JP) .............................. JP2017-195038

(51) Int. Cl.
*B64F 1/22* (2006.01)
*B64C 27/08* (2006.01)
*B64C 39/02* (2006.01)
*B64D 47/08* (2006.01)
*B64D 27/24* (2006.01)

(52) U.S. Cl.
CPC .............. *B64F 1/228* (2013.01); *B64C 27/08* (2013.01); *B64C 39/02* (2013.01); *B64D 27/24* (2013.01); *B64D 47/08* (2013.01); *B64C 2201/024* (2013.01); *B64C 2201/201* (2013.01)

(58) Field of Classification Search
CPC ......... B64C 2201/201; B64C 2201/208; B64F 1/222; B64F 1/007
See application file for complete search history.

(56) References Cited

U.S. PATENT DOCUMENTS

| | | | | |
|---|---|---|---|---|
| 9,387,940 | B2* | 7/2016 | Godzdanker | B64F 1/28 |
| 10,343,794 | B2* | 7/2019 | Conyers | H02J 7/35 |
| 10,453,348 | B2* | 10/2019 | Speasl | G06Q 10/08 |
| 10,974,849 | B2* | 4/2021 | Kim | B64F 1/222 |

(Continued)

FOREIGN PATENT DOCUMENTS

| | | |
|---|---|---|
| CN | 107010241 | 8/2017 |
| CN | 107176307 | 9/2017 |

(Continued)

OTHER PUBLICATIONS

Japanese Office Action for Japanese Patent Application No. 2017-195038 dated Oct. 6, 2020.

(Continued)

*Primary Examiner* — Brian M O'Hara
(74) *Attorney, Agent, or Firm* — Amin, Turocy & Watson, LLP

(57) ABSTRACT

A storage system for a flying object is equipped with a landing portion having a landing surface on which the flying object can land, and a storage main body for storing the flying object that has landed on the landing surface. The storage main body includes opening and closing portions that cover the landing surface. The storage system is further equipped with retaining mechanisms adapted to retain the flying object in a state of having landed on the landing surface from a direction perpendicular to the landing surface.

11 Claims, 7 Drawing Sheets

(56) References Cited

U.S. PATENT DOCUMENTS

| | | | | |
|---|---|---|---|---|
| 11,214,367 B2* | 1/2022 | Brock | .................... | G07C 5/008 |
| 2017/0158353 A1* | 6/2017 | Schmick | ................. | B64F 1/007 |
| 2018/0245365 A1* | 8/2018 | Wankewycz | .............. | H02J 7/00 |

FOREIGN PATENT DOCUMENTS

| | | |
|---|---|---|
| JP | 2017-105314 | 6/2017 |
| WO | 2017/029611 | 2/2017 |
| WO | 2017/149451 | 9/2017 |

OTHER PUBLICATIONS

Chinese Office Action and Search Report for Chinese Patent Application No. 201811169444.2 dated Sep. 18, 2021.

* cited by examiner

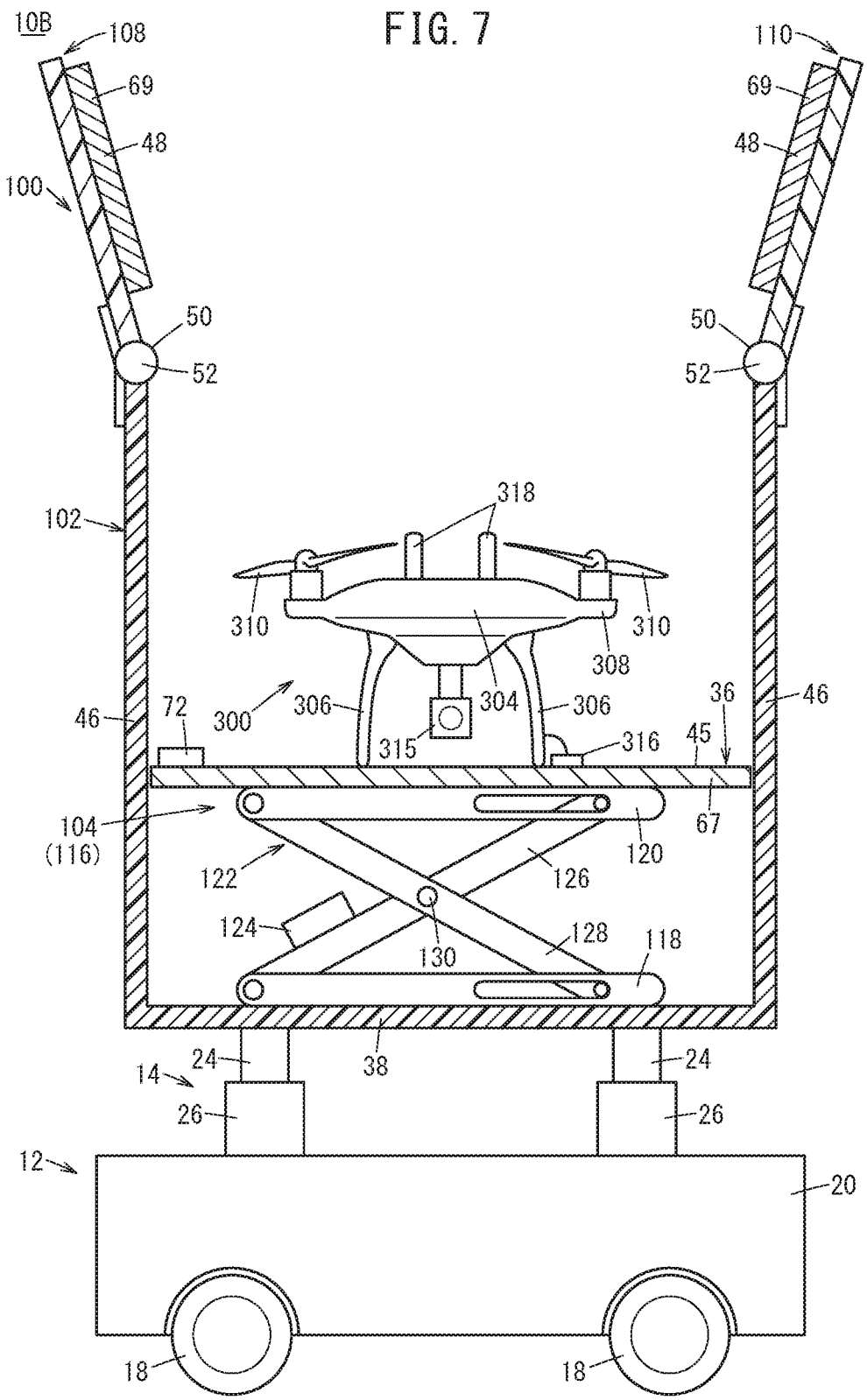

STORAGE SYSTEM FOR FLYING OBJECT

CROSS-REFERENCE TO RELATED APPLICATION

This application is based upon and claims the benefit of priority from Japanese Patent Application No. 2017-195038 filed on Oct. 5, 2017, the contents of which are incorporated herein by reference.

BACKGROUND OF THE INVENTION

Field of the Invention

The present invention relates to a storage system for a flying object including a landing surface on which a flying object such as a drone or the like can land.

Description of the Related Art

For example, in Japanese Laid-Open Patent Publication No. 2017-105314, a storage system is disclosed for storing a flying robot. The storage system includes a storage unit for storing the flying robot, and a charging stand provided inside the storage unit and which is capable of retaining the flying robot. The storage unit includes a support member that supports the charging stand, and an opening and closing portion which is provided so as to be capable of opening and closing with respect to the support member. On an upper surface of the charging stand, a concave portion is formed in which a convex portion of the flying robot can be fitted.

SUMMARY OF THE INVENTION

However, according to the above-described conventional technique, the flying robot is retained by fitting the convex portion of the flying robot into the concave portion that is formed on the upper surface of the charging stand. Therefore, the shape and size of flying robots which are capable of being retained on the charging stand are limited, and there is a concern that the flying robot (flying object) cannot be held in a stable manner in the vertical direction.

The present invention has been devised taking into consideration the aforementioned problems, and has the object of providing a storage system for a flying object, which is capable of stably retaining the flying object in a vertical direction regardless of the shape and size of the flying object.

In order to achieve the above-described object, a storage system for a flying object according to the present invention comprises a landing portion having a landing surface on which the flying object is capable of landing, and a storage main body adapted to store the flying object that has landed on the landing surface, wherein the storage main body includes an opening and closing portion adapted to cover the landing surface, and the storage system further comprises a retaining mechanism adapted to retain the flying object in a state of having landed on the landing surface from a direction perpendicular to the landing surface.

In accordance with such a configuration, regardless of the shape and size of the flying object, it is possible for the flying object to be retained in a stable manner in the vertical direction by the retaining mechanism.

In the above-described storage system, the retaining mechanism may include a pressing member adapted to press the flying object that has landed on the landing surface in a direction toward the landing surface.

In accordance with such a configuration, it is possible to retain the flying object between the pressing member and the landing surface.

In the above-described storage system, the retaining mechanism may include an elevating mechanism capable of raising and lowering the landing portion.

In accordance with such a configuration, by raising the landing portion upwardly by the elevating mechanism, it is possible to sandwich and grip the flying object between the landing surface and a ceiling part of the opening and closing portion.

In the above-described storage system, there may further be provided a horizontal sensor adapted to detect a horizontal angle of the landing surface.

In accordance with such a configuration, it is possible to easily know the horizontal angle of the landing surface.

In the above-described storage system, there may further be provided a horizontal support member adapted to support the storage main body in a manner so that a horizontal angle of the landing surface can be adjusted.

In accordance with such a configuration, the flying object can be made to land stably on the landing surface, and together therewith, the flying object can be retained in a more stable manner.

The above-described storage system may further comprise an opening and closing control unit which, when the flying object lands on the landing surface, in the case that the horizontal angle detected by the horizontal sensor lies within a predetermined angular range, is adapted to control the opening and closing portion so as to open, whereas in the case that the horizontal angle does not lie within the predetermined angular range, is adapted to control the opening and closing portion so as to close.

In accordance with such a configuration, since the flying object is capable of landing on the landing surface only in the event that the horizontal angle of the landing surface lies within the predetermined angular range, the flying object can be made to land more stably on the landing surface.

The above-described storage system may further comprise a retaining control unit adapted to control the retaining mechanism in a manner so that the flying object that has landed on the landing surface is retained in a state with the opening and closing portion closed.

In accordance with such a configuration, when retaining the flying object, it is possible to prevent the landing surface from becoming wet due to rain or the like.

The above-described storage system may further comprise a charging unit adapted to charge the flying object that has landed on the landing surface.

In accordance with such a configuration, it is possible to charge the flying object while in a stored state.

In the above-described storage system, the charging unit may further comprise a first electrode that constitutes the landing portion, and a second electrode provided on the retaining mechanism, wherein, in a state in which the flying object is retained by the retaining mechanism, a first charging terminal of the flying object may be electrically connected to the first electrode, and a second charging terminal of the flying object may be electrically connected to the second electrode.

In accordance with such a configuration, it is possible to charge the flying object while the flying object is retained.

The above-described storage system may further comprise a traveling mechanism that enables the storage system to be moved.

In accordance with such a configuration, the storage system can be moved by the traveling mechanism.

In the above-described storage system, the retaining mechanism may include a pressing member adapted to press the flying object that has landed on the landing surface in a direction toward the landing surface, and the second electrode may be provided on the pressing member.

In accordance with such a configuration, with a simple configuration, the second electrode can be brought into contact with the second charging terminal of the flying object, and therefore, it is possible to electrically connect the second electrode and the second charging terminal in a reliable manner.

In the above-described storage system, the retaining mechanism may include a displacement mechanism provided on the opening and closing portion and adapted to displace the pressing member in a direction perpendicular to the landing surface.

In accordance with such a configuration, by displacing the pressing member by the displacement mechanism toward a side where the landing surface is positioned, it is possible to sandwich and grip the flying object between the pressing member and the landing surface.

According to the present invention, since the retaining mechanism is provided which retains the flying object that has landed on the landing surface from a direction perpendicular to the landing surface, regardless of the shape and size of the flying object, it is possible for the flying object to be retained in a stable manner in the vertical direction by the retaining mechanism.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a partial cross-sectional front view showing a state in which opening and closing portions of the storage system of FIG. 5 are opened.

DESCRIPTION OF THE PREFERRED EMBODIMENTS

Preferred embodiments of a flying object storage system according to the present invention will be described in detail below with reference to the accompanying drawings.

First Embodiment

Figure 1:
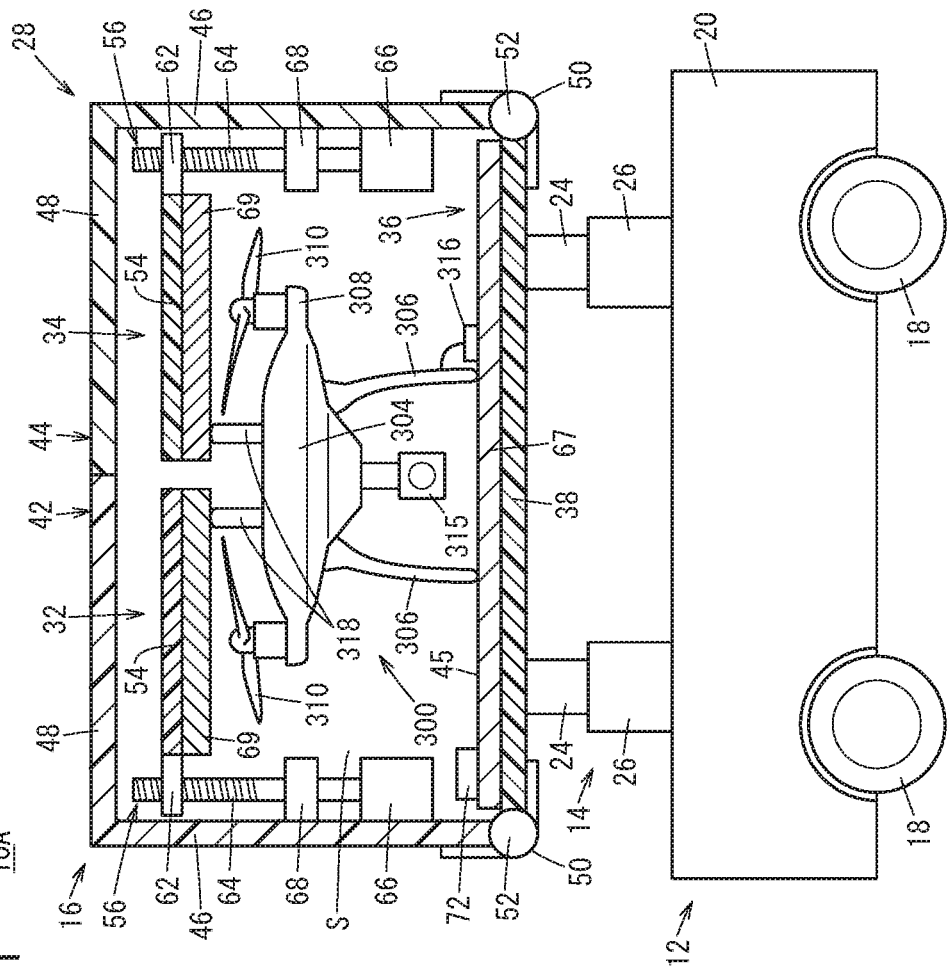
FIG. 1 is a partial cross-sectional view of a storage system for a flying object according to a first embodiment of the present invention.

As shown in FIG. 1, a storage system 10A according to a first embodiment of the present invention serves as a system for storing a flying object 300. The flying object 300 is configured, for example, in the form of a drone (unmanned aerial vehicle). However, the flying object 300 is not limited to being a drone, but may be a manned helicopter or the like.

Figure 2:
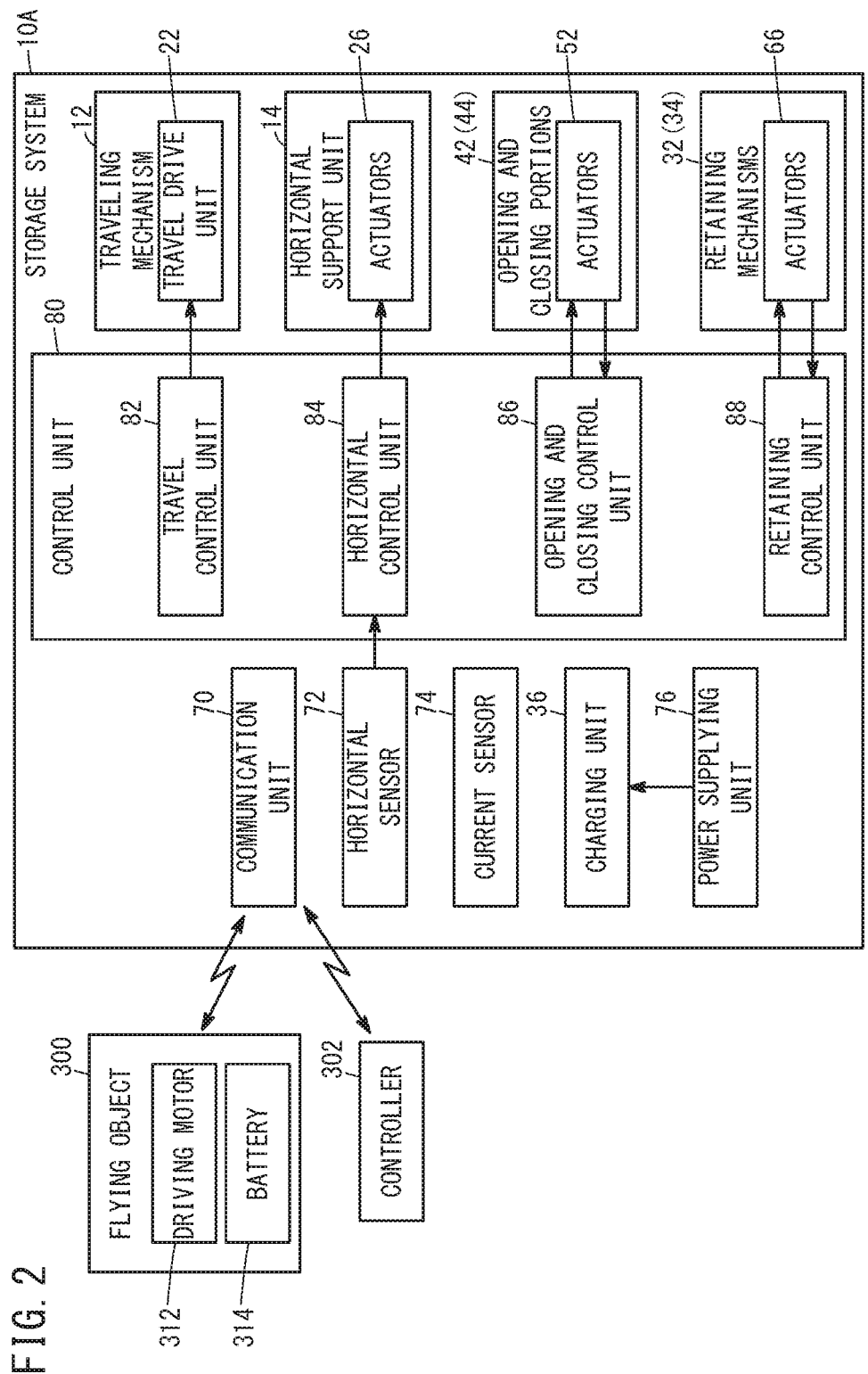
FIG. 2 is a block diagram of the storage system of FIG. 1.

As shown in FIGS. 1 and 2, the flying object 300 is configured to be steerable by a controller 302, and includes a body portion 304, a plurality of leg portions 306, a plurality of arm portions 308, a plurality of propellers 310, a driving motor 312, and a battery 314. An image capturing camera 315 is provided on a lower surface of the body portion 304. The plurality of leg portions 306 extend downward from the body portion 304. The plurality of arm portions 308 extend laterally from the body portion 304. The propellers 310 are provided on each of the arm portions 308. The driving motor 312 is operated to rotate each of the propellers 310. The battery 314 supplies electrical power to the driving motor 312, the camera 315, and the like.

As shown in FIG. 1, a first charging terminal 316 and second charging terminals 318 are electrically connected to the battery 314 (see FIG. 2). The first charging terminal 316 and the second charging terminals 318 are made respectively from a material having a relatively high electric conductivity such as copper or the like. The first charging terminal 316 is provided on a leg portion 306 in a state of being connected electrically to a positive electrode (or a negative electrode) of the battery 314. Two second charging terminals 318 extend upwardly from an upper surface of the body portion 304 in a state of being electrically connected to a negative electrode (or a positive electrode) of the battery 314.

The storage system 10A is a self-propelled type of system, and is configured to enable charging in a state in which the flying object 300 is stored therein. The storage system 10A includes a traveling mechanism 12, a horizontal support unit 14, and a storage unit 16.

The traveling mechanism 12 moves the storage system 10A, and is configured in the form of a wheeled vehicle. The traveling mechanism 12 includes a plurality of (for example, four) wheels 18, a vehicle body 20, and a travel drive unit 22 (see FIG. 2). The travel drive unit 22 operates to rotate each of the respective wheels 18, and is configured in the form of a motor, for example. However, the travel drive unit 22 may also be an engine, or a combination of an engine and a motor.

The traveling mechanism 12 may be configured in the form of a crawler vehicle equipped with a crawler instead of the wheels 18. Further, the traveling mechanism 12 need not necessarily be a self-propelled type of vehicle, but may be one that is towed and is capable of traveling by another vehicle or the like. In this case, the traveling mechanism 12 does not include the travel drive unit 22.

The horizontal support unit 14 supports the storage unit 16 in a manner so that a landing surface 45 on which the flying object 300 is capable of landing is kept horizontal. The horizontal support unit 14 is interposed between an upper surface of the vehicle body 20 and a lower surface of the storage unit 16. The horizontal support unit 14 includes a plurality of (for example, four) support columns 24, and a plurality of actuators 26 which enable each of the support columns 24 to be expanded and retracted. The plurality of support columns 24 are provided at four corners of a lower surface of the storage unit 16. The number and position of the support columns 24 can be arbitrarily changed.

The storage unit 16 is equipped with a storage main body 28, two retaining mechanisms 32, 34, and a charging unit 36. The storage main body 28 constitutes a storage chamber S for the purpose of storing (accommodating) the flying object 300. The storage main body 28 includes a bottom wall portion 38, and two opening and closing portions 42, 44 provided on the bottom wall portion 38 so as to be capable of opening and closing. The bottom wall portion 38 is constituted in the form of a flat plate shape. On an upper surface of the bottom wall portion 38, a first electrode 67 is fixed thereto that serves as a landing portion. The upper surface of the first electrode 67 functions as the landing surface 45 on which the flying object 300 can land.

The bottom wall portion 38 is made of, for example, an insulating material such as a resin or the like. However, the bottom wall portion 38 may be made of a metal material. In this case, an insulating material is interposed between the bottom wall portion 38 and the first electrode 67 so that the bottom wall portion 38 and the first electrode 67 are electrically insulated from each other.

The opening and closing portion 42 includes a side wall portion 46, a ceiling part 48, a hinge member 50, and an actuator 52. The side wall portion 46 serves to cover the flying object 300 from a lateral direction in a state of having landed on the landing surface 45. The ceiling part 48 serves to cover the flying object 300 from above in a state of having landed on the landing surface 45. The ceiling part 48 extends toward an inner surface side of the side wall portion 46, from an end of the side wall portion 46 on an opposite side from the hinge member 50. The hinge member 50 connects the side wall portion 46 so as to be capable of opening and closing (capable of rotating) with respect to the bottom wall portion 38.

Figure 4:
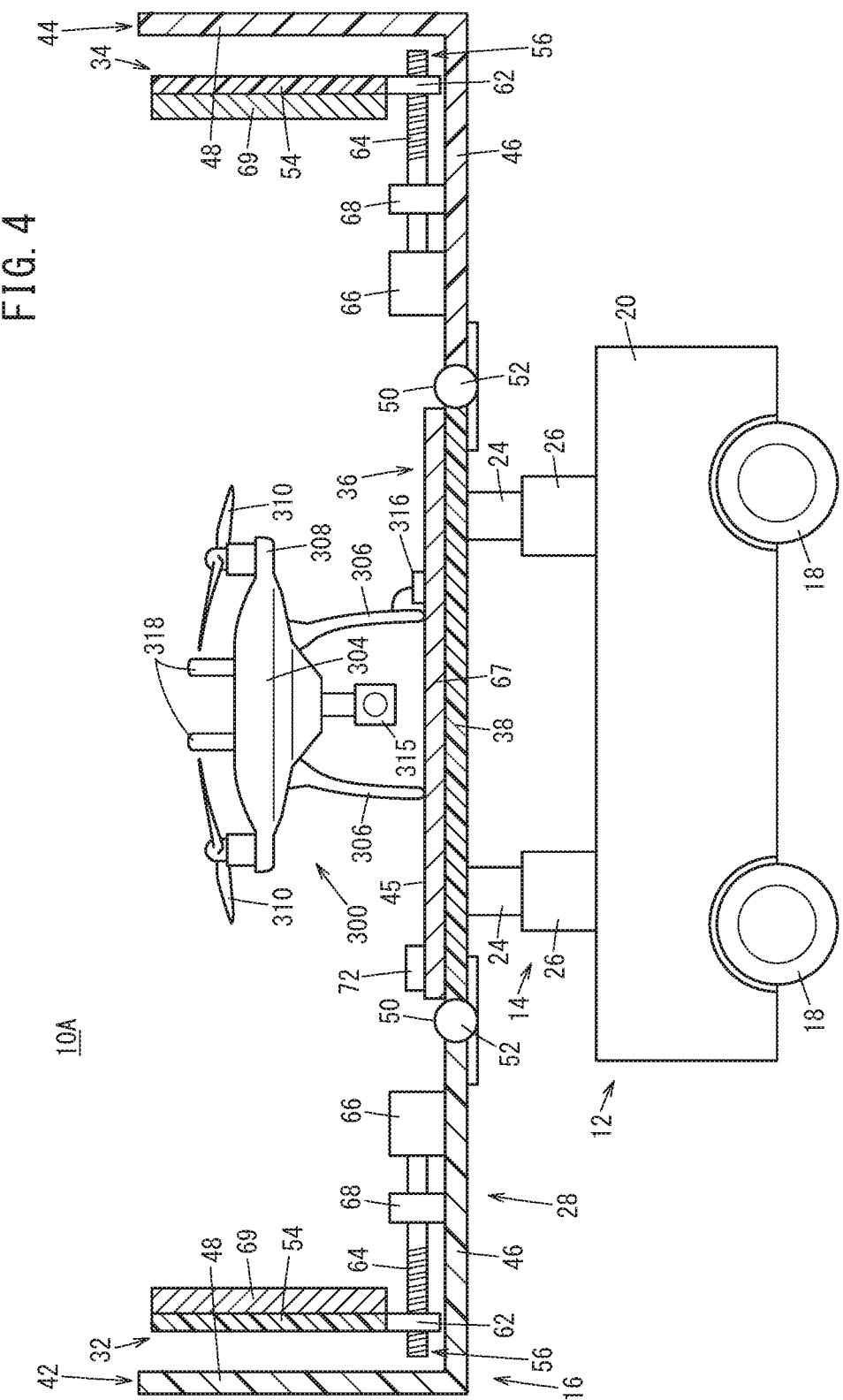
FIG. 4 is a partial cross-sectional front view showing a state in which opening and closing portions of the storage system of FIG. 1 are opened.

The actuator 52 opens and closes the side wall portions 46 with respect to the bottom wall portion 38 by rotating a rotational shaft of the hinge member 50. More specifically, the actuator 52 opens and closes (rotates) the side wall portion 46 within an angular range of 90° with respect to the bottom wall portion 38 (see FIGS. 1 and 4). However, the angular range within which it is possible to open and close the side wall portion 46 with respect to the bottom wall portion 38 can be set arbitrarily. The opening and closing portion 44 is configured in the same manner as the opening and closing portion 42, and thus, detailed description thereof is omitted.

In the storage unit 16, the landing surface 45 is exposed in a state in which the two opening and closing portions 42, 44 are open (see FIG. 4), and the landing surface 45 is covered completely by the opening and closing portions 42, 44 in a state in which the two opening and closing portions 42, 44 are closed (see FIG. 1). The respective ceiling parts 48 are brought into liquid-tight contact with each other in the state in which the two opening and closing portions 42, 44 are closed. Consequently, it is possible to prevent entry of rain or the like into the storage chamber S.

The retaining mechanisms 32, 34 serve to retain the flying object 300 in a state of having landed on the landing surface 45 from a direction (vertical direction) perpendicular to the landing surface 45. Stated otherwise, the retaining mechanisms 32, 34 retain the flying object 300 that has landed on the landing surface 45 in a state in which the two opening and closing portions 42, 44 are closed. The retaining mechanism 32 includes a pressing member 54 for pressing the flying object 300 in a state of having landed on the landing surface 45 in a direction (downwardly) toward the landing surface 45, and a displacement mechanism 56 for displacing the pressing member 54 in the vertical direction.

The pressing member 54 is a plate-shaped member that extends in parallel with the ceiling part 48. A second electrode 69 is fixed to a lower surface (a surface directed toward the landing surface 45) of the pressing member 54. The pressing member 54 is made of, for example, an insulating material such as a resin or the like. However, the pressing member 54 may be made of a metal material. In this case, an insulating material is interposed between the pressing member 54 and the second electrode 69 so that the pressing member 54 and the second electrode 69 are electrically insulated from each other.

The displacement mechanism 56 includes a nut part 62 that is fixed to the pressing member 54, a screw shaft 64 with which the nut part 62 is screw-engaged, and an actuator 66 that rotates the screw shaft 64. The screw shaft 64 is rotatably supported by a bearing 68 which is fixed to the inner surface of the side wall portion 46. The actuator 66 is also fixed to the inner surface of the side wall portion 46.

Except for being provided on the opening and closing portion 44, the retaining mechanism 34 is configured in the same manner as the retaining mechanism 32, and thus, detailed description thereof is omitted.

The charging unit 36 is operated in order to charge the flying object 300 that has landed on the landing surface 45, and includes the first electrode 67 serving as a landing portion, and two second electrodes 69 provided on the retaining mechanisms 32, 34. Each of the first electrode 67 and the second electrodes 69 is made of a metal material having a relatively high electric conductivity such as copper or the like. The first electrode 67 is electrically connected to the positive electrode (or a negative electrode) of a power supplying unit 76 (see FIG. 2), and the second electrode 69 is electrically connected to a negative electrode (or a positive electrode) of the power supplying unit 76 (see FIG. 2). In a state in which the two opening and closing portions 42, 44 are closed, the first electrode 67 and the respective second electrodes 69 face toward each other.

The first electrode 67 is a plate-shaped member fixed to an upper surface of the bottom wall portion 38. However, the first electrode 67 may be constituted by depositing a metal on the upper surface of the bottom wall portion 38. The first electrode 67 is provided substantially over the entire upper surface of the bottom wall portion 38. The second electrodes 69 are plate-shaped members which are fixed to the lower surfaces of the pressing members 54. However, the second electrodes 69 may be constituted by depositing a metal on the lower surfaces of the pressing members 54. The second electrodes 69 are provided substantially over the entire lower surfaces of the pressing members 54.

As shown in FIG. 2, the storage system 10A is further equipped with a communication unit 70, a horizontal sensor 72, a current sensor 74, the power supplying unit 76, and a control unit 80. The communication unit 70 carries out information communications between the flying object 300 and the controller 302. The horizontal sensor 72 is an inclination sensor for detecting a horizontal angle of the landing surface 45. Output signals from the horizontal sensor 72 are input to the control unit 80. The horizontal sensor 72 is disposed on the landing surface 45 (see FIG. 1).

In a state in which the first electrode 67 and the first charging terminal 316 are electrically connected to each other, and the second electrode 69 and the second charging terminal 318 are electrically connected to each other, the current sensor 74 detects a remaining battery amount of the battery 314 of the flying object 300. The power supplying unit 76 supplies electricity for use in charging the battery 314 of the flying object 300. Further, the power supplying unit 76 supplies electricity to the various electrical components of the storage system 10A.

The control unit 80 comprises a travel control unit 82, a horizontal control unit 84, an opening and closing control unit 86, and a retaining control unit 88. The travel control unit 82 causes the storage system 10A to move by controlling the travel drive unit 22. On the basis of output signals from the horizontal sensor 72, the horizontal control unit 84 outputs drive signals to the actuators 26 of the horizontal support unit 14. More specifically, the horizontal control unit 84 controls the actuators 26 of the horizontal support unit 14 in a manner so that the horizontal angle acquired by the horizontal sensor 72 falls within a predetermined angular range.

The opening and closing control unit 86 outputs drive signals to the actuators 52 of the opening and closing portions 42, 44. Position information of the actuators 52 (degree-of-opening information of the opening and closing portions 42, 44) is input to the opening and closing control unit 86. More specifically, the opening and closing control unit 86 feedback-controls the actuators 52 of the opening and closing portions 42, 44.

The retaining control unit 88 outputs drive signals to the actuators 66 of the retaining mechanisms 32, 34. Position information of the actuators 66 (position information of the pressing members 54) is input to the retaining control unit 88. More specifically, the retaining control unit 88 feedback-controls the actuators 66 of the retaining mechanisms 32, 34.

Next, operations of the storage system 10A, which is configured as described above, will be explained in relation to operations of storing and charging the flying object 300 inside the storage chamber S of the storage system 10A. In an initial state, the flying object 300 is in flight, and the opening and closing portions 42, 44 are fully closed. Further, the travel control unit 82 terminates driving of the travel drive unit 22. However, the travel control unit 82 may drive the travel drive unit 22 and allow the storage system 10A to travel.

First, in step S1, the control unit 80 determines whether or not the communication unit 70 of the storage system 10A has received a landing request signal. The landing request signal is transmitted from the flying object 300 to the communication unit 70 of the storage system 10A. However, the landing request signal may be transmitted from the controller 302 to the communication unit 70 of the storage system 10A. If the control unit 80 determines that the communication unit 70 has not received the landing request signal (step S1: NO), the process of step S1 is repeated.

If the control unit 80 determines that the communication unit 70 has received the landing request signal (step S1: YES), then in step S2, the horizontal control unit 84 initiates the horizontal control. More specifically, the horizontal control unit 84 controls the actuators 26 of the horizontal support unit 14 in a manner so that the horizontal angle of the landing surface 45 detected by the horizontal sensor 72 falls within a predetermined angular range.

Thereafter, in step S3, the control unit 80 determines whether or not the horizontal angle of the landing surface 45 lies within the predetermined angular range. If the control unit 80 determines that the horizontal angle does not lie within the predetermined angular range (step S3: NO), the horizontal control unit 84 continues to carry out the horizontal control.

When the control unit 80 determines that the horizontal angle lies within the predetermined angular range (step S3: YES), then in step S4, the opening and closing control unit 86 controls the actuators 52 to thereby open the opening and closing portions 42, 44. In addition, in step S5, the opening and closing control unit 86 determines whether or not the respective opening and closing portions 42, 44 are fully opened. If the opening and closing control unit 86 determines that the respective opening and closing portions 42, 44 are not fully opened (step S5: NO), then the opening and closing control unit 86 continues the operation of opening the opening and closing portions 42, 44 in step S4.

If the opening and closing control unit 86 has determined that the opening and closing portions 42, 44 are fully opened (step S5: YES), then in step S6, the control unit 80 transmits a landing permission signal from the communication unit 70 to the flying object 300. The control unit 80 may also transmit the landing permission signal from the communication unit 70 of the storage system 10A to the controller 302. Upon receiving the landing permission signal, the flying object 300 starts to land on the landing surface 45. The landing behavior of the flying object 300 is performed by an automated control. However, the landing behavior of the flying object 300 may be performed by operations of the controller 302 made by a user.

Further, in step S7, the control unit 80 determines whether or not the flying object 300 has landed on the landing surface 45. When the flying object 300 has landed on the landing surface 45, the first charging terminal 316 is electrically connected to the first electrode 67. Therefore, placement of the flying object 300 on the landing surface 45 can be detected by the presence or absence of an electrical connection between the first charging terminal 316 and the first electrode 67. However, landing of the flying object 300 on the landing surface 45 may be detected using a contact sensor or the like. If the control unit 80 determines that the flying object 300 has not landed on the landing surface 45 (step S7: NO), the control unit 80 continues transmission of the landing permission signal in step S6.

If the control unit 80 determines that the flying object 300 has landed on the landing surface 45 (step S7: YES), then in step S8, the opening and closing control unit 86 controls the actuators 52 to thereby close the respective opening and closing portions 42, 44. In addition, in step S9, the opening and closing control unit 86 determines whether or not the respective opening and closing portions 42, 44 are fully closed. If the opening and closing control unit 86 determines that the respective opening and closing portions 42, 44 are not fully closed (step S9: NO), then the operation of closing the opening and closing portions 42, 44 is continued in step S8.

If the opening and closing control unit 86 determines that the respective opening and closing portions 42, 44 are fully closed (step S9: YES), then in step S10, the retaining control unit 88 drives the retaining mechanisms 32, 34 to thereby retain the flying object 300. More specifically, the retaining control unit 88 controls the actuators 66 and rotates the screw shafts 64, thereby moving the pressing members 54 toward the side of the landing surface 45.

Subsequently, in step S11, the control unit 80 determines whether or not the second electrodes 69 have contacted the second charging terminals 318 of the flying object 300. If the control unit 80 has determined that the second electrodes 69 are not in contact with the second charging terminals 318 (step S11: NO), movement of the pressing members 54 is continued in step S10.

If the control unit 80 has determined that the second electrodes 69 are in contact with the second charging terminals 318 (step S11: YES), then in step S12, driving of the retaining mechanisms 32, 34 is terminated. More specifically, the retaining control unit 88 controls the actuators 66 and stops rotation of the screw shafts 64, thereby terminating movement of the pressing members 54 toward the side of the landing surface 45. Consequently, the flying object 300 is sandwiched and gripped by the first electrode 67 and the second electrodes 69 from the direction perpendicular to the landing surface 45.

Thereafter, in step S13, the horizontal control unit 84 terminates the horizontal control. More specifically, the horizontal control unit 84 stops driving the actuators 26 of the horizontal support unit 14. In addition, in step S14, the control unit 80 confirms by the current sensor 74 the remaining battery amount of the battery 314 of the flying object 300. Subsequently, in step S15, the control unit 80 determines whether or not it is necessary for the battery 314 to be charged. More specifically, in the case that the remaining battery amount of the battery 314 is greater than or equal to a predetermined value, the control unit 80 determines that it is unnecessary to charge the battery 314, whereas if the remaining battery amount of the battery 314 is less than the predetermined value, the control unit 80 determines that it is necessary to charge the battery 314.

If the control unit 80 determines that it is unnecessary to charge the battery 314 (step S15: NO), then in step S14, the control unit 80 reconfirms the remaining battery amount of the battery 314. If the control unit 80 determines that it is necessary to charge the battery 314 (step S15: YES), then in step S16, the control unit 80 outputs a charging request signal to the power supplying unit 76. Consequently, electricity is supplied from the power supplying unit 76 to the battery 314 via the charging unit 36, and the battery 314 is charged. At this stage, the current cycle of the flowchart is brought to an end.

According to the present embodiment, the following effects are obtained.

The storage main body 28 includes the opening and closing portions 42, 44 that cover the landing surface 45, and is equipped with the retaining mechanisms 32, 34 that retain the flying object 300 in a state of having landed on the landing surface 45 from a direction perpendicular to the landing surface 45. In accordance with this feature, regardless of the shape and size of the flying object 300, it is possible for the flying object 300 to be retained in a stable manner in the vertical direction by the retaining mechanisms 32, 34.

The retaining mechanisms 32, 34 include the pressing members 54 which press the flying object 300 that has landed on the landing surface 45 in a direction toward the landing surface 45. In accordance with this feature, it is possible to retain the flying object 300 between the pressing members 54 and the landing surface 45.

The storage system 10A is equipped with the horizontal sensor 72 that detects the horizontal angle of the landing surface 45. In accordance with this feature, it is possible to easily know the horizontal angle of the landing surface 45.

The storage system 10A is equipped with the horizontal support unit 14 that supports the storage main body 28 in a manner so that a horizontal angle of the landing surface 45 can be adjusted. In accordance with this feature, the flying object 300 can be made to land stably on the landing surface 45, and together therewith, the flying object 300 can be retained in a more stable manner.

The opening and closing control unit 86 controls the opening and closing portions 42, 44 in a manner so that, when the flying object 300 lands on the landing surface 45, in the case that the horizontal angle detected by the horizontal sensor 72 lies within a predetermined angular range, the opening and closing portions 42, 44 are opened, whereas in the case that the horizontal angle does not lie within the predetermined angular range, the opening and closing portions 42, 44 are closed. In accordance with this feature, since the flying object 300 is capable of landing on the landing surface 45 only in the event that the horizontal angle of the landing surface 45 lies within the predetermined angular range, the flying object 300 can be made to land more stably on the landing surface 45.

The retaining control unit 88 controls the retaining mechanisms 32, 34 in a manner so that the flying object 300 that has landed on the landing surface 45 is retained in a state with the opening and closing portions 42, 44 closed. Therefore, when retaining the flying object 300, it is possible to prevent the landing surface 45 from becoming wet due to rain or the like.

Since the storage system 10A is equipped with the charging unit 36 that charges the flying object 300 that has landed on the landing surface 45, it is possible to charge the flying object 300 while the flying object 300 is in a stored state.

The charging unit 36 comprises the first electrode 67 that constitutes the landing portion, and the second electrodes 69 that constitute the retaining mechanisms 32, 34. In a state in which the flying object 300 is retained by the retaining mechanisms 32, 34, the first charging terminal 316 of the flying object 300 is electrically connected to the first electrode 67, and the second charging terminals 318 of the flying object 300 are electrically connected to the second electrodes 69. In accordance with this feature, it is possible to charge the flying object 300 while the flying object 300 is retained.

The storage system 10A is equipped with the traveling mechanism 12 that enables the storage system 10A to be moved. In accordance with this feature, the storage system 10A can be moved by the traveling mechanism 12.

The retaining mechanisms 32, 34 include the pressing members 54 that press the flying object 300 that has landed on the landing surface 45 in a direction toward the landing surface 45, and the second electrodes 69 are provided on the pressing members 54. In accordance with such a configuration, with a simple configuration, the second electrodes 69 can be brought into contact with the second charging terminals 318 of the flying object 300, and therefore, it is possible to electrically connect the second electrodes 69 and the second charging terminals 318 in a reliable manner.

The retaining mechanisms 32, 34 include the displacement mechanisms 56 provided on the opening and closing portions 42, 44 and which displace the pressing members 54 in a direction perpendicular to the landing surface 45. In accordance with such a configuration, by displacing the pressing members 54 by the displacement mechanisms 56 toward a side where the landing surface 45 is positioned, it is possible to sandwich and grip the flying object 300 between the pressing members 54 and the landing surface 45.

Second Embodiment

Next, a description will be given of a storage system 10B according to a second embodiment of the present invention. In the storage system 10B according to the second embodiment, the same constituent elements as those described in the aforementioned first embodiment are denoted using the same reference numerals, and detailed description of such features is omitted. Further, in the second embodiment, configurations thereof which are the same as those in the first embodiment produce the same effects.

Figure 5:
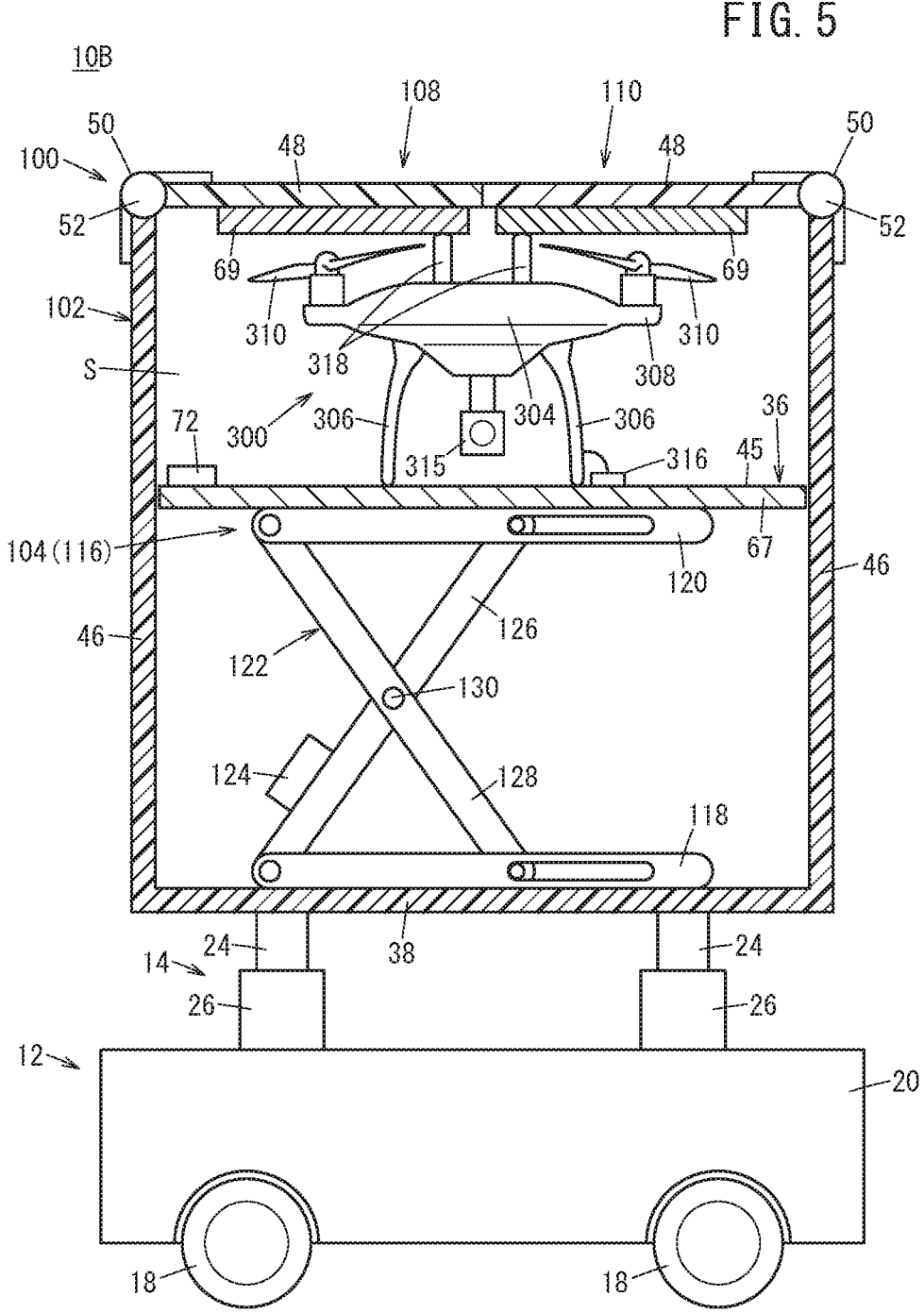
FIG. 5 is a partial cross-sectional view of a storage system for a flying object according to a second embodiment of the present invention.

As shown in FIG. 5, the storage system 10B includes the traveling mechanism 12, the horizontal support unit 14, and a storage unit 100. The storage unit 100 is equipped with a storage main body 102, a retaining mechanism 104, and the charging unit 36.

The storage main body 102 includes a bottom wall portion 38, side wall portions 46, and two opening and closing portions 108, 110. The side wall portions 46 protrude upwardly from outer edge portions of the bottom wall portion 38. The opening and closing portion 108 includes a hinge member 50, a ceiling part 48, and an actuator 52. The hinge member 50 connects the ceiling part 48 so as to be capable of opening and closing (capable of rotating) with respect to the side wall portion 46.

The actuator 52 opens and closes the ceiling part 48 with respect to the side wall portion 46 by rotating a rotational shaft of the hinge member 50. More specifically, the actuator 52 opens and closes (rotates) the ceiling part 48 within an angular range of 90° with respect to the side wall portion 46 (see FIGS. 5 and 7). However, the angular range within which it is possible to open and close the ceiling part 48 with respect to the side wall portion 46 can be set arbitrarily. A second electrode 69 is fixed to an inner surface of the ceiling part 48. The opening and closing portion 110 is configured in the same manner as the opening and closing portion 108, and thus, detailed description thereof is omitted.

Figure 6:
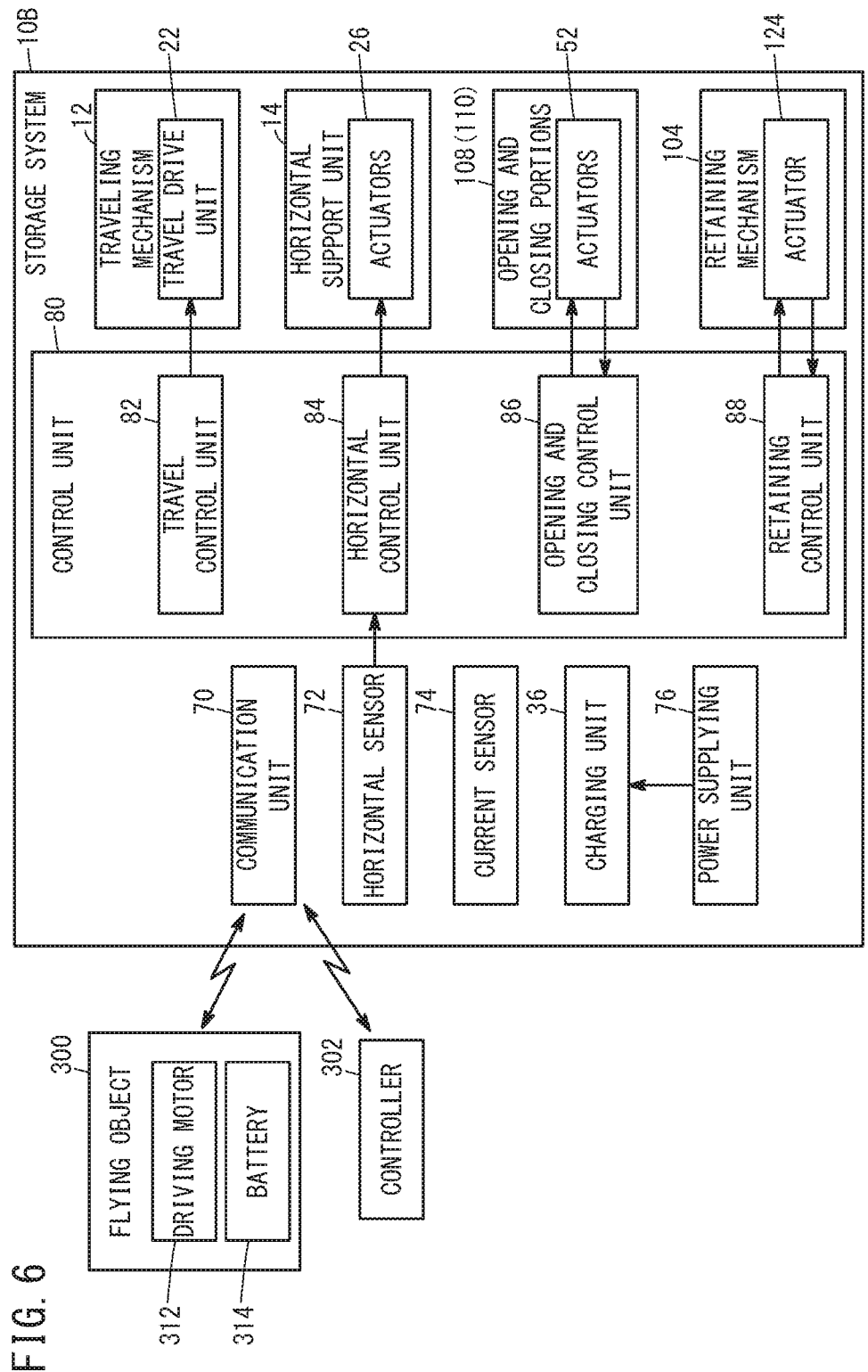
FIG. 6 is a block diagram of the storage system of FIG. 5.

The retaining mechanism 104 includes an elevating mechanism 116 capable of raising and lowering the first electrode 67 that serves as the landing portion. The elevating mechanism 116 includes a base portion 118, a table 120, a lift portion 122, and an actuator 124 (see FIGS. 5 and 6). The base portion 118 is a frame which is fixed to an upper surface (inner surface) of the bottom wall portion 38. The table 120 is a flat plate member arranged so as to face toward the base portion 118. The first electrode 67 is fixed to an upper surface of the table 120.

The lift portion 122 serves to raise and lower the table 120 with respect to the base portion 118, and includes a first arm 126 and a second arm 128. One end of the first arm 126 is disposed in a rotatable manner on the base portion 118. The other end of the first arm 126 is disposed so as to be capable of moving in one direction with respect to the table 120.

One end of the second arm 128 is disposed so as to be capable of moving in one direction with respect to the base portion 118. The direction of movement of the one end of the second arm 128 is the same as the direction of movement of the other end of the first arm 126. The other end of the second arm 128 is disposed in a rotatable manner on the table 120. The first arm 126 and the second arm 128 are connected so as to be capable of rotating mutually via a rotary axis 130 at a central position in the direction of extension.

The actuator 124 changes the angle of inclination of the first arm 126 and the second arm 128 with respect to the base portion 118. More specifically, the actuator 124 raises the table 120 by erecting the first arm 126 and the second arm 128 with respect to the base portion 118. Further, the actuator 124 lowers the table 120 by laying the first arm 126 and the second arm 128 down lengthwise on the base portion 118.

Next, operations of the storage system 10B, which is configured as described above, will be explained in relation to operations of storing and charging the flying object 300 inside the storage chamber S of the storage system 10B.

Figure 3:
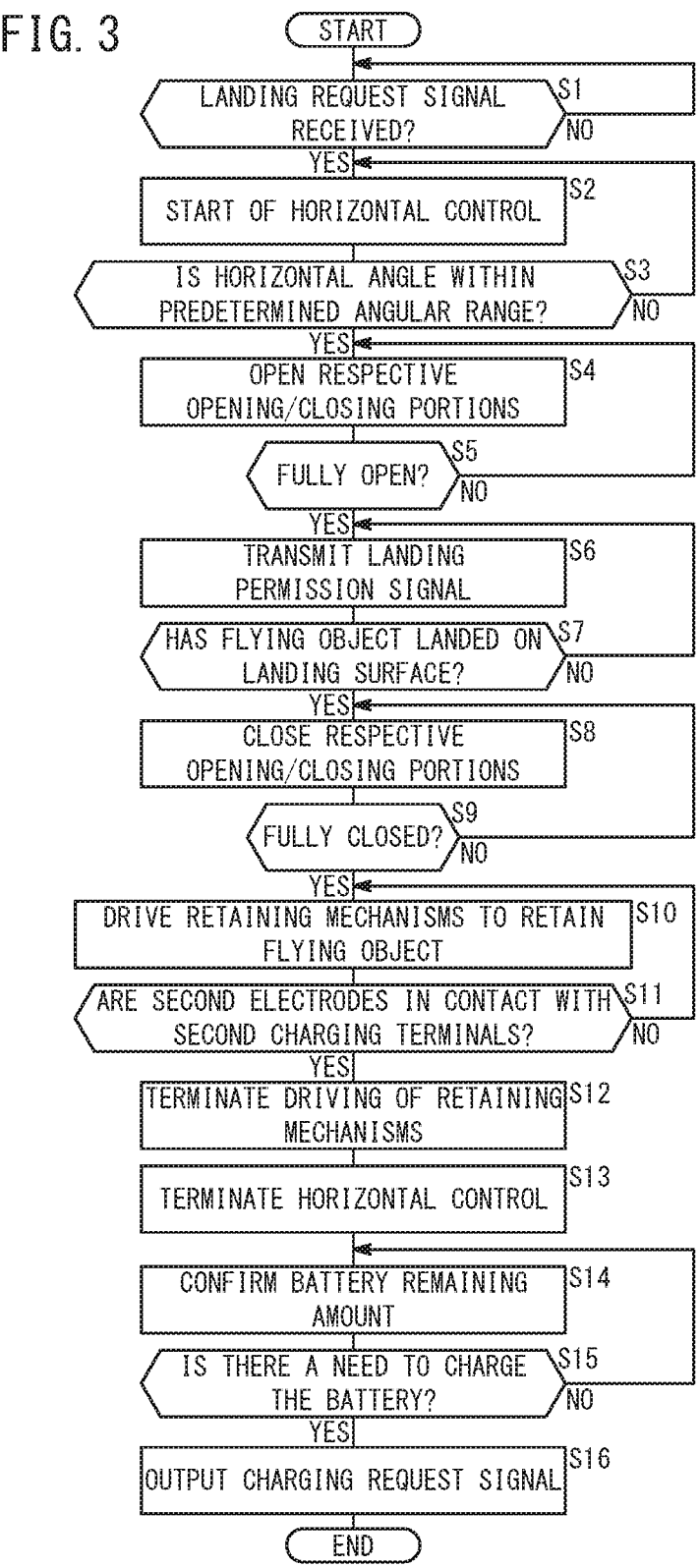
FIG. 3 is a flowchart for describing operations of the flying object implemented by the storage system of FIG. 1.

The operation to charge the flying object 300 using the storage system 10B according to the present embodiment differs with respect to the aforementioned flowchart of FIG. 3 only in regards to the processes of steps S10 to S12. Therefore, in the present embodiment, only the processes of steps S10 to S12 will be described. Moreover, in the initial state, the table 120 of the retaining mechanism 104 is located at a lower limit position thereof by the first arm 126 and the second arm 128 being folded so as to lie down against the base portion 118.

According to the present embodiment, in step S10 of FIG. 3, in the case that the flying object 300 is retained by the retaining mechanism 104, the retaining control unit 88 controls the actuator 124, and thereby raises the table 120 by erecting the first arm 126 and the second arm 128 with respect to the base portion 118. Consequently, the flying object 300 is brought into adjoining contact with respect to the ceiling parts 48 (the second electrodes 69).

Subsequently, in step S11, the control unit 80 determines whether or not the second electrodes 69 have contacted the second charging terminals 318 of the flying object 300. If the control unit 80 has determined that the second electrodes 69 are not in contact with the second charging terminals 318 (step S11: NO), raising of the table 120 is continued in step S10.

If the control unit 80 has determined that the second electrodes 69 are in contact with the second charging terminals 318 (step S11: YES), then in step S12, the retaining control unit 88 terminates raising of the table 120. More specifically, the retaining control unit 88 controls the actuator 124 in order to stop driving of the first arm 126 and the second arm 128, and thereby terminate the upward movement of the table 120. Consequently, the flying object 300 is sandwiched and gripped by the first electrode 67 and the second electrodes 69 from the direction perpendicular to the landing surface 45.

In the storage system 10B according to the present embodiment, the retaining mechanism 104 includes the elevating mechanism 116 which is capable of raising and lowering the first electrode 67 that constitutes the landing portion. Consequently, by raising the first electrode 67 upwardly by the elevating mechanism 116, it is possible to sandwich and grip the flying object 300 between the landing surface 45 and the ceiling parts 48 of the opening and closing portions 108, 110.

Moreover, the elevating mechanism 116 is not limited to being a table lift as in the present embodiment, but a zip chain lifter or the like can also be applied thereto.

The flying object storage system according to the present invention is not limited to the embodiments described above, and it goes without saying that various modified or additional configurations could be adopted therein without departing from the essence and gist of the present invention as set forth in the appended claims.

What is claimed is:

1. A storage system for a flying object, comprising:
a landing portion having a landing surface on which the flying object is capable of landing;
a storage main body adapted to store the flying object that has landed on the landing surface, the storage main body including an opening and closing portion adapted to cover and enclose the landing surface;
a retaining mechanism mounted on the storage main body and adapted to retain the flying object in a state of having landed on the landing surface from a direction perpendicular to the landing surface,
a horizontal support unit including actuators adapted to support the storage main body in a manner so that a horizontal angle of the landing surface can be adjusted, and a horizontal control unit adapted to control the actuators so that a horizontal angle of the landing surface falls within a predetermined angular range.

2. The storage system for a flying object according to claim 1, wherein the retaining mechanism includes a pressing member adapted to press the flying object that has landed on the landing surface in a direction toward the landing surface.

3. The storage system for a flying object according to claim 1, wherein the retaining mechanism includes an elevating mechanism capable of raising and lowering the landing portion.

4. The storage system for a flying object according to claim 1, further comprising a horizontal sensor adapted to detect a horizontal angle of the landing surface.

5. A storage system for a flying object, comprising:
a landing portion having a landing surface on which the flying object is capable of landing; and
a storage main body adapted to store the flying object that has landed on the landing surface,
wherein the storage main body includes an opening and closing portion adapted to cover the landing surface; and
the storage system further comprises
a retaining mechanism adapted to retain the flying object in a state of having landed on the landing surface from a direction perpendicular to the landing surface,
a horizontal sensor adapted to detect a horizontal angle of the landing surface, and
an opening and closing control unit which, when the flying object lands on the landing surface, in the case that the horizontal angle detected by the horizontal sensor lies within a predetermined angular range, is adapted to control the opening and closing portion so as to open, whereas in the case that the horizontal angle does not lie within the predetermined angular range, is adapted to control the opening and closing portion so as to close.

6. The storage system for a flying object according to claim 1, further comprising a retaining control unit adapted to control the retaining mechanism in a manner so that the flying object that has landed on the landing surface is retained in a state with the opening and closing portion closed.

7. The storage system for a flying object according to claim 1, further comprising a charging unit adapted to charge the flying object that has landed on the landing surface.

8. The storage system for a flying object according to claim 7, the charging unit comprising:
a first electrode that constitutes the landing portion; and
a second electrode provided on the retaining mechanism;
wherein, in a state in which the flying object is retained by the retaining mechanism, a first charging terminal of the flying object is electrically connected to the first electrode, and a second charging terminal of the flying object is electrically connected to the second electrode.

9. The storage system for a flying object according to claim 1, further comprising a traveling mechanism that enables the storage system to move.

10. The storage system for a flying object according to claim 8, wherein:
the retaining mechanism includes a pressing member adapted to press the flying object that has landed on the landing surface in a direction toward the landing surface; and
the second electrode is provided on the pressing member.

11. The storage system for a flying object according to claim 2, wherein the retaining mechanism includes a displacement mechanism provided on the opening and closing portion and adapted to displace the pressing member in a direction perpendicular to the landing surface.

\* \* \* \* \*